United States Patent
Heer

[11] Patent Number: 6,139,274
[45] Date of Patent: Oct. 31, 2000

[54] RADIAL IMPELLER FOR A CENTRIFUGAL PUMP

[75] Inventor: Siegfried Heer, Kirchdorf/Krems, Austria

[73] Assignee: TCG Unitech Aktiengesellschaft, Kirchdorf/Krems, Austria

[21] Appl. No.: 09/365,783

[22] Filed: Aug. 3, 1999

[30] Foreign Application Priority Data

Aug. 6, 1998 [AT] Austria .................................. 1357/98

[51] Int. Cl.⁷ ............................................. B63H 1/16
[52] U.S. Cl. ................................. 416/186 R; 416/189
[58] Field of Search .................................. 416/183, 185, 416/186 R, 223 B, 241 A, 189, 193 R; 415/77; 264/328.1

[56] References Cited

U.S. PATENT DOCUMENTS

| | | | |
|---|---|---|---|
| 3,918,831 | 11/1975 | Grennan | 415/131 |
| 4,150,916 | 4/1979 | Tsutsui et al. | 415/143 |
| 5,087,171 | 2/1992 | Dosch et al. | 415/169.1 |
| 5,370,509 | 12/1994 | Golding et al. | 417/423.1 |
| 6,074,167 | 6/2000 | Olifirove et al. | 415/131 |

FOREIGN PATENT DOCUMENTS

| | | |
|---|---|---|
| 2309635 | 9/1973 | Germany . |
| 2312023 | 10/1997 | United Kingdom . |

*Primary Examiner*—Edward K. Look
*Assistant Examiner*—James M McAleenan
*Attorney, Agent, or Firm*—Dykema Gossett PLLC

[57] ABSTRACT

A radial impeller for a centrifugal pump with at least one flow channel between an axial flow inlet zone and a substantially radial flow outlet zone, which flow channel is limited by the inside and outside surfaces of at least one rotor blade and by first and second annular channel surfaces which substantially extend transversally to the axis of the radial impeller, face one another and are integrally arranged with the radial impeller. In order to simplify the production of the radial impeller it is provided that the channel surfaces are provided with different diameters, with the smallest diameter of the first channel surface being slightly smaller than the largest diameter of the second channel surface and with preferably the first channel surface being arranged on the side of the inlet zone of the radial impeller.

5 Claims, 2 Drawing Sheets

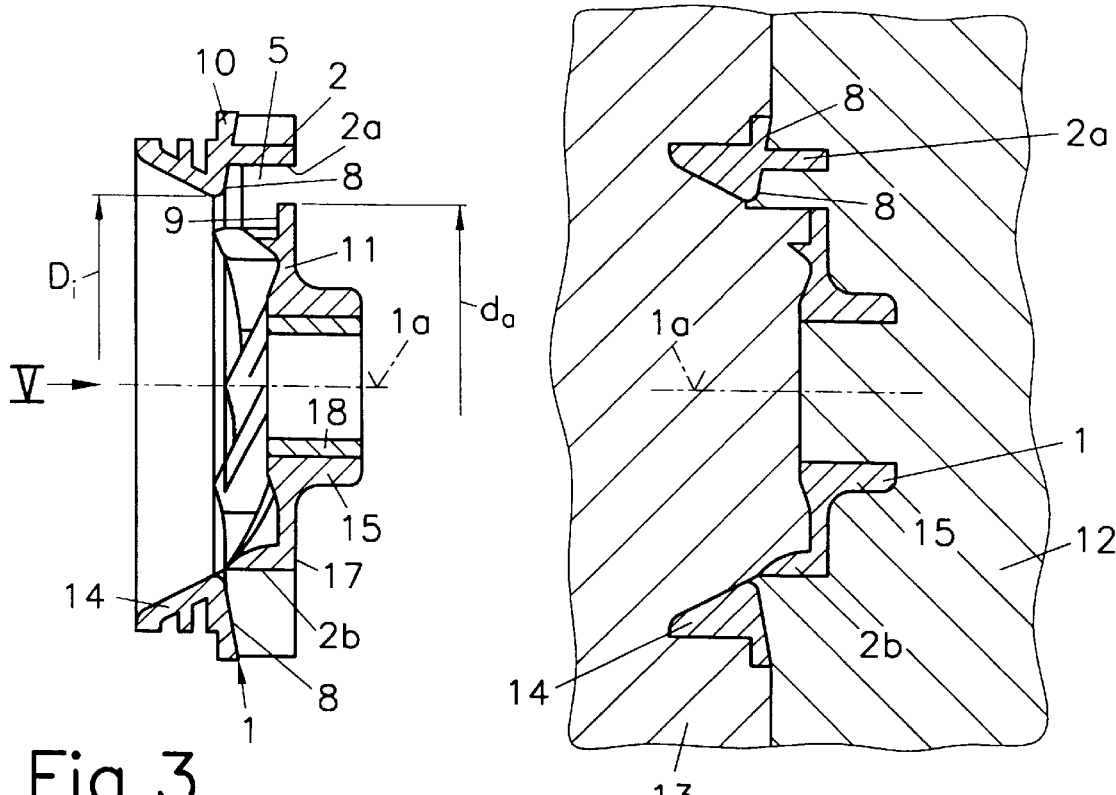
Fig.3
Fig.4
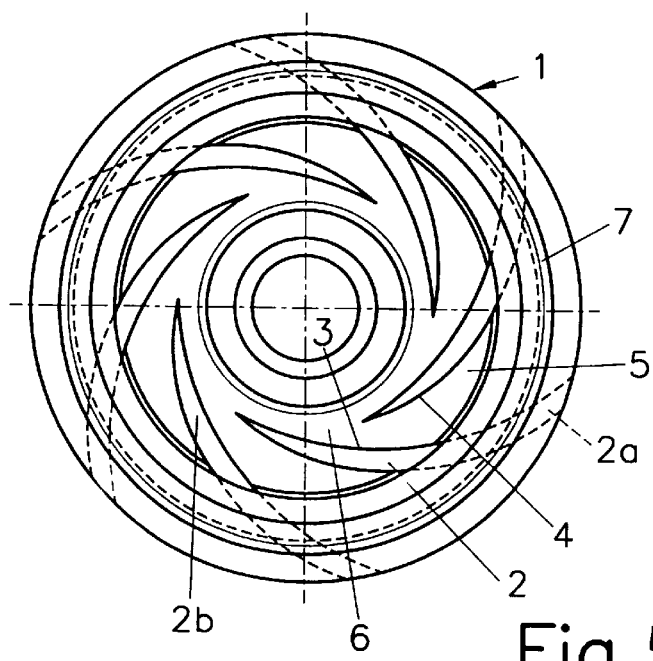
Fig.5

RADIAL IMPELLER FOR A CENTRIFUGAL PUMP

BACKGROUND OF THE INVENTION

The invention relates to a radial impeller for a centrifugal pump with at least one flow channel between an axial flow inlet zone and a substantially radial flow outlet zone, which flow channel is limited by the inside and outside surfaces of at least one rotor blade and by first and second annular channel surfaces substantially extending transversally to the axis of the radial impeller, facing one another and being integrally arranged with the radial impeller.

DESCRIPTION OF THE PRIOR ART

It is known to produce closed impellers in one part in an injection moulding or casting process. The flow channels are shaped by means of radially arranged slide pins which are removed after the shaping. One slide pin is required for each flow channel. However, this is tool- and time-consuming.

From DE 23 09 635 A a blower wheel for a linen drier is known in which the blades are held on an outer ring for stiffening. As a result, a light and still sturdy arrangement is achieved without impairing the favorable ability to be removed from the mould. No channel surface within the terms of the invention is disclosed, however. A two-piece impeller is disclosed in GB 2 312 023 A in which it is necessary to join the parts by gluing or welding. Such an impeller is complex in its production.

SUMMARY OF THE INVENTION

It is the object of the present invention to avoid such disadvantages and to simplify the production of impellers.

This object is achieved in accordance with the invention in such a way that the channel surfaces are provided with different diameters, with the smallest diameter of the first channel surface being slightly smaller than the largest diameter of the second channel surface and with preferably the first channel surface being arranged on the side of the inlet zone of the radial impeller. The impeller is provided with a half open arrangement on the rear side which is averted from the inlet zone. The moulding tool can thus be provided with a very simple arrangement. Since in this way it is possible to have several cavities per tool, productivity can also be increased.

It is particularly preferable when the radial impeller can be produced by a moulding tool whose halves are movable towards one another axially with respect to the axis of the radial impeller, with the first channel surface and parts of the at least one rotor blade which are located outside of the smallest diameter of the first channel surface being producible by a first half of the mould and the second channel surface and parts of the at least one rotor blade which are located within the largest diameter of the second channel surface can be produced by a second half of the mould. The two halves of the mould are closed prior to the injection moulding process in the direction of the impeller axis and are opened after the injection moulding process in the direction of the impeller axis. The rotor blades are thus no longer produced by radially moved slide pins, but instead by axially moved mould halves in a two-part injection mould.

The invention is particularly suitable for impellers that are made of plastic. Impellers can also be made of metallic or ceramic material.

BRIEF DESCRIPTION OF THE DRAWINGS

The invention is now explained below in closer by reference to the enclosed drawings, wherein:

FIG. 3 shows a longitudinal sectional view through the impeller in accordance with the invention.

FIG. 4 shows a longitudinal sectional view through an axial impeller which is analog to FIG. 3 and is situated in an injection mould.

FIG. 5 shows a top view of the radial impeller in accordance with the arrow V in FIG. 3.

DETAILED DESCRIPTION OF THE PREFERRED EMBODIMENTS

Figure 1:
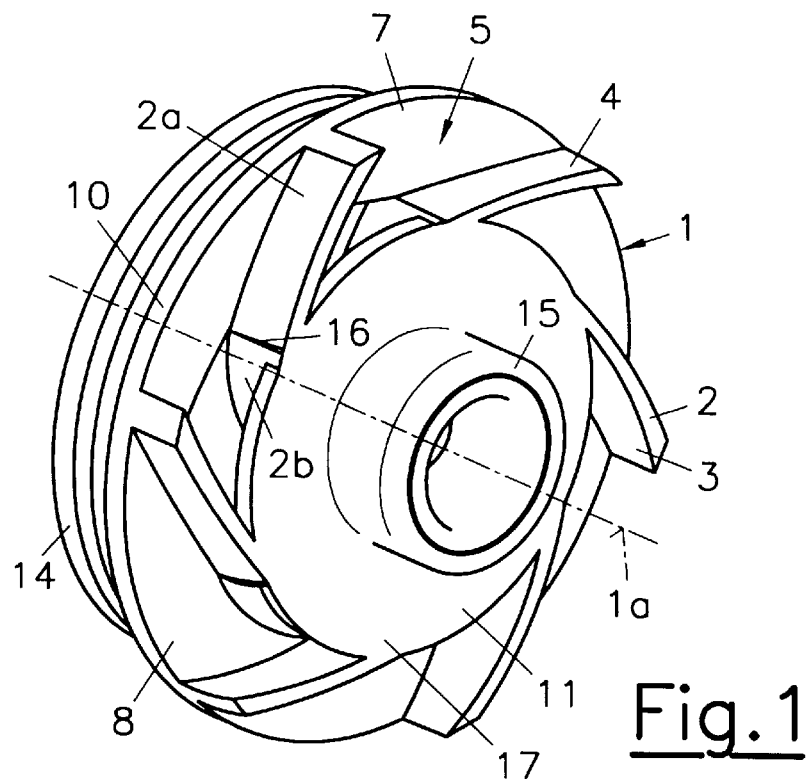
FIGS. 1 and 2 show oblique views of the impeller in accordance with the invention.
Figure 2:
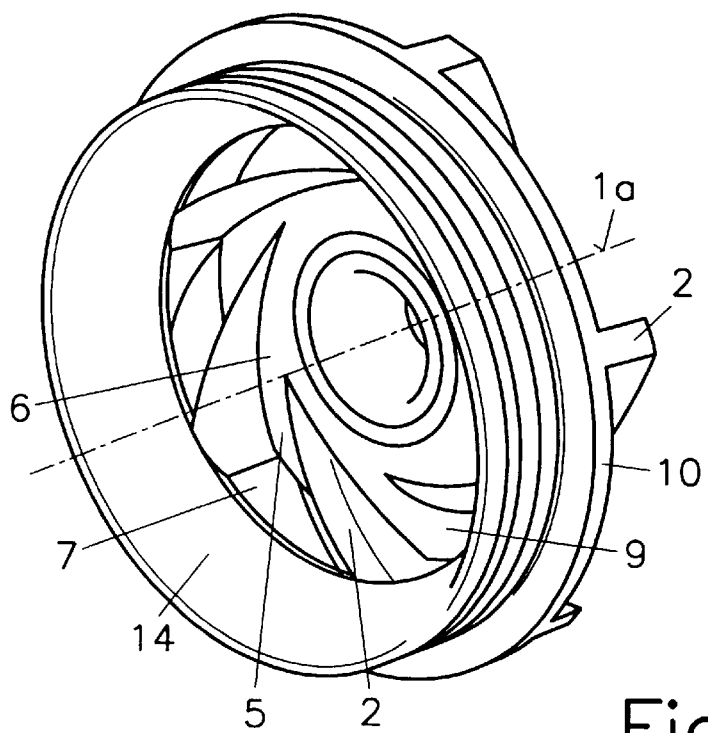

Radial impeller 1 as illustrated in FIGS. 1 to 5 is provided with several rotor blades 2. The inside surface 3 and the outside surface 4 of two adjacent rotor blades each define a flow channel 5 which extends from an axial inlet zone 6 close to axis 1a of the impeller 1 to a radial or tangential outlet zone 7. On the face side the flow channel 5 are limited by annular first and second channel surfaces 8 and 9 which are formed by the first and second walls 10 and 11 of the radial impeller 1. The channel surfaces 8 and 9 are arranged substantially normal to the axis 1a of the radial impeller 1 or only slightly inclined to a normal plane on axis 1a. The bearing of radial impeller 1 is designated with reference numeral 18.

The first channel surface 8 and the second channel surface 9 are arranged on opposite sides of the flow channels 5. The smallest diameter $D_i$ is provided with an arrangement which is at least as large as the largest diameter $d_a$ of the second channel surface 9. This allows producing the impeller 1 with two mould halves 12 and 13 which are displaceable towards one another in the direction of axis 1a.

As is shown in FIG. 4, the first channel surface 8 and parts 2a of the impellers 2 which are disposed outside of the diameter $D_i$ as well as the impeller hub 14 are formed by the first mould half 12. The second channel surface 9 as well as parts 2b of the rotor blades which are disposed within the diameter $d_a$ are formed by the second mould half 13 which is disposed on the side of inlet 14 of impeller 1. The structure of the inlet zone 14 is also formed by the second mould half 13. Hub 15 of radial impeller 1 is substantially defined by the first mould half 12.

A small seam 16 can form on the rotor blades 2 in the zone of the inner diameter $D_i$ or outer diameter $d_a$, as is illustrated in FIG. 1. By suitable shaping of the mould halves 12, 13 the seam 16 can be limited to a minimum, so that there are no substantial disadvantages on the flow even without any finishing.

As is further shown in FIG. 1, the rear side 17 of the radial impeller 1 is provided with a semi-open arrangement, so that the outer parts 2a of the rotor blades 2 can be shaped with the first mould half 12. The moulding tool comprising the two mould halves 12, 13 is very simple and has the additional advantage that several cavities can be housed in one moulding tool, which substantially increases productivity.

I claim:

1. A radial impeller for a centrifugal pump with at least one flow channel between an axial flow inlet zone and a substantially radial flow outlet zone, which flow channel is limited by inside and outside surfaces of at least one rotor blade and by first and second annular channel surfaces which substantially extend transversally to an axis of the radial impeller, face one another and are integrally arranged with the radial impeller, wherein the channel surfaces are provided with different diameters, with a smallest diameter of the first channel surface being slightly smaller than a largest diameter of the second channel surface and with the first channel surface being arranged on the side of the inlet zone of the radial impeller.

2. A radial impeller according to claim 1, wherein the radial impeller is produced by a two-part moulding tool whose mould halves can be moved axially towards one another with respect to the axis of the radial impeller, with the first channel surface and parts of the at least one rotor blade which are located outside of the smallest diameter of the first channel surface being producible by a first half of the mould and the second channel surface and parts of the at least one rotor blade which are located within the largest diameter of the second channel surface being producible by a second half of the mould.

3. A radial impeller according to claim 1, wherein the radial impeller is provided on a rear side averted from the inlet zone with a semi-open arrangement.

4. A radial impeller according to claim 1, wherein the radial impeller is made of plastic and is produced in an injection moulding process.

5. A method to produce a radial impeller in an injection moulding process, wherein the radial impeller is produced by a two-part moulding tool whose two mould halves are closed prior to the injection moulding process in the direction of an axis of the radial impeller and after the injection moulding process are opened in the direction of the axis of the radial impeller, with a first channel surface and parts of the at least one rotor blade which are located outside of a smallest diameter of the first channel surface being moulded by a first half of the mould and a second channel surface and parts of the at least one rotor blade which are located within a largest diameter of the second channel surface being moulded by a second half of the mould.

* * * * *